(12) United States Patent
Hann

(10) Patent No.: US 6,769,092 B1
(45) Date of Patent: Jul. 27, 2004

(54) METHOD AND SYSTEM FOR TESTING LINKED LIST INTEGRITY

(75) Inventor: William P. Hann, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 09/920,270

(22) Filed: Jul. 31, 2001

(51) Int. Cl.[7] .............................................. G06F 11/00
(52) U.S. Cl. ...................................... 714/799; 714/719
(58) Field of Search ................................ 714/799, 718, 714/719, 736, 735, 765, 764

(56) References Cited

U.S. PATENT DOCUMENTS

| | | | | |
|---|---|---|---|---|
| RE31,582 E | * | 5/1984 | Hosaka et al. ............... | 701/102 |
| 5,319,778 A | * | 6/1994 | Catino ........................ | 707/102 |
| 5,560,006 A | * | 9/1996 | Layden et al. .................. | 707/2 |
| 6,044,444 A | * | 3/2000 | Ofek .......................... | 711/162 |
| 6,185,569 B1 | * | 2/2001 | East et al. ................... | 707/101 |
| 6,487,202 B1 | * | 11/2002 | Klausmeier et al. ..... | 370/395.1 |
| 6,557,056 B1 | * | 4/2003 | Lanteigne et al. ............ | 710/52 |
| 6,611,930 B1 | * | 8/2003 | Ostrowsky et al. ......... | 714/718 |
| 6,680,933 B1 | * | 1/2004 | Cheesman et al. .......... | 370/352 |

* cited by examiner

Primary Examiner—Phung M. Chung
(74) Attorney, Agent, or Firm—Baker Botts L.L.P.

(57) ABSTRACT

According to one embodiment of the invention, a method is provided for testing linked list integrity. The method includes storing a plurality of link pointers in memory in association with respective integrity parameters. The link pointers point to a next location in the memory storing a subsequent link pointer in the linked list. The method also includes reading the stored integrity parameter for at least one of the link pointers. The method also includes determining whether the value of the read integrity parameter matches the value of the stored integrity parameter.

38 Claims, 6 Drawing Sheets

| ADDRESS 122 | LINK POINTER 124 | INTEGRITY PARAMETER 126 | CELL POINTER 128 |
|---|---|---|---|
| 0 | 1 | 0 | 18 |
| 1 |  | 1 | 82 |
| 2 | 3 | 0 | 282 |
| 3 | 5 | 1 | 15 |
| 4 | 6  138 | 0  140 | 3  142 |
| 5 | 8 | 2 | 4 |
| 6  144 | 7  146 | 1 | 76 |
| 7  148 | 20  150 | 2 | 14 |
| 8 | 9 | 3 | 36 |
| ... | ... | ... | ... |
| 18 | 19 | 1 | 8 |
| 19 | 21 | 2 | 7 |
| 20  149 | 25  152 | 3 | 123 |
| 21 | 22 | 3 | 64 |
| 22 | 23 | 0 | 65 |
| 23 | 24 | 1 | 46 |
| 24 | 26 | 2 | 32 |
| 25  154 |  | 0 | 154 |
| 26 | 27 | 3 | 13 |
| ... | ... | ... | ... |
| N | N | M | 1012 |

LINK MEMORY

| ADDRESS | LINK POINTER | LINK MEMORY — INTEGRITY PARAMETERS | | | |
|---|---|---|---|---|---|
| 122 | 124 | 126 | | | |
| | | INCREMENT BY ONE UP TO 3 | SHIFT BIT BY 1 UP 2 64 | SAME AS ADDRESS | SIX LESS THAN ADDRESS |
| 0 | | 0 | 1 | 0 | 6 |
| 1 | | 1 | 2 | 1 | 7 |
| 2 | | 2 | 4 | 2 | 8 |
| 3 | | 3 | 8 | 3 | 9 |
| 4 | | 0 | 16 | 4 | 10 |
| 5 | | 1 | 32 | 5 | 11 |
| 6 | | 2 | 64 | 6 | 12 |
| 7 | | 3 | 1 | 7 | 13 |
| 8 | | 0 | 2 | 8 | 14 |
| 9 | | 1 | 4 | 9 | 15 |
| 10 | | 2 | 8 | 10 | 16 |

METHOD AND SYSTEM FOR TESTING LINKED LIST INTEGRITY

TECHNICAL FIELD OF THE INVENTION

This invention relates generally to data storage and more particularly to a method and system for testing linked list integrity.

BACKGROUND OF THE INVENTION

Telecommunications is becoming increasingly important in today's society. The increased use of the Internet allows people to communicate data between home or business and remote locations. One format for communicating data is asynchronous transfer mode (ATM) format. Many other formats also exist.

Among other criteria, when communicating information according to ATM, cells of data of a specified size are transmitted from one location to another. Often times the cells are stored in memory at an intermediate location before being transferred to the desired destination. An example of such a procedure is the use of an ATM switch at a telecommunications central office for switching data originating from a user's home over the Internet to an appropriate destination over an Internet backbone. Such cells are often scored in a sequential manner such that data that are received first by the memory are distributed first. To effect such sequential transmission, queues are formed that designate which cells are transferred first. In some implementations, a queue exists for each destination. Such procedures apply to some communications formats other than ATM.

Linked lists are used in some systems to store queues of ATM cells (or other types of data) to facilitate sequential transmissions. Linked lists may be formatted in a variety of fashions; however, linked lists generally link together subsequent addresses in linked memory that are associated in some way with addresses in cell memory. The memory location in cell memory associated with the cell memory addresses actually store that data.

A problem with linked lists is that the entire linked list is lost if any of the pointers become corrupted.

SUMMARY OF THE INVENTION

According to one embodiment of the invention, a method is provided for testing linked list integrity. The method includes storing a plurality of link pointers in memory in association with respective integrity parameters. The link pointers point to a next location in the memory storing a subsequent link pointer in the linked list. The method also includes reading the stored integrity parameter for at least one of the link pointers. The method also includes determining whether the value of the read integrity parameter matches the value of the stored integrity parameter.

Some embodiments of the invention provide numerous technical advantages. Other embodiments may realize some, none, or all of these advantages. For example, according to one embodiment, the integrity of linked lists may be easily determined, which allows selective use of corrupted memory locations without having to reset the entire card that may be associated with the memory. This allows for more robust operation of whatever device utilizes the linked list, whether the device be an ATM switch or other device. Additionally, according to one embodiment, a count of memory locations that are corrupted may be maintained. Such a count facilitates discarding and replacing a corrupt device at an appropriate time.

Other technical advantages may be readily ascertained to one of skill in the art.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS OF THE INVENTION

Embodiments of the invention and its advantages are best understood by referring to FIGS. 1A through 6 of the drawings, like numerals being used for like and corresponding parts of the various drawings.

Figure 1A:
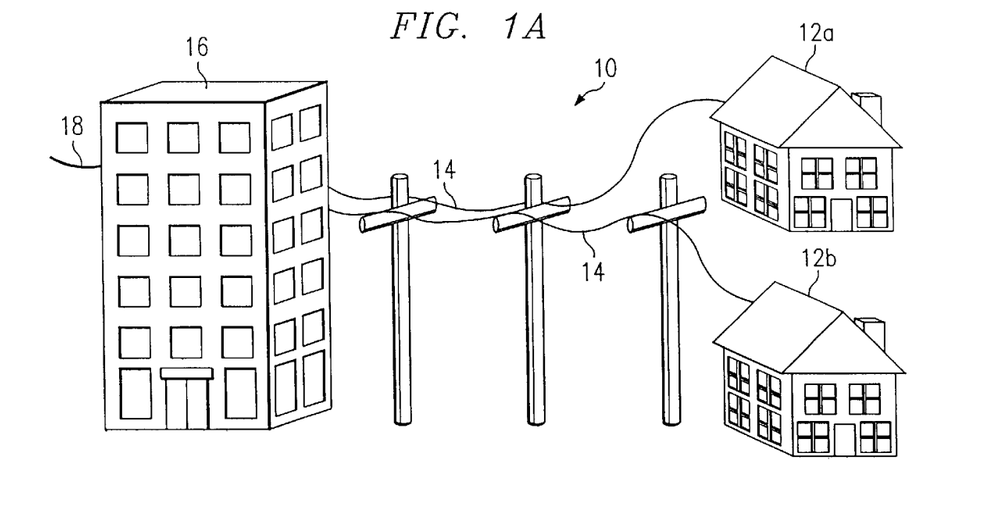
FIG. 1A is a schematic diagram showing a communication system that may utilize the teachings of the present invention.

FIG. 1A is a schematic diagram showing a telecommunications system 10 that may utilize the teachings of the invention. Telecommunications system 10 includes a plurality of customer homes 12a, 12b connected to a telecommunications central office 16 through a plurality of telephone wires 14. Central office 16 may in turn couple homes 12a and 12b to an Internet backbone 18.

Telecommunications system 10 therefore allows communication of data between homes 12a and 12b and locations remote from homes 12a and 12b (not explicitly shown) through Internet backbone 18. As described in greater detail below, central office 16 includes an asynchronous transfer mode (ATM) switch, described above, that effects switching of data from homes 12a and 12b to Internet backbone 18 as well as switching of data received over Internet backbone 18 to homes 12a and 12b.

Figure 1B:
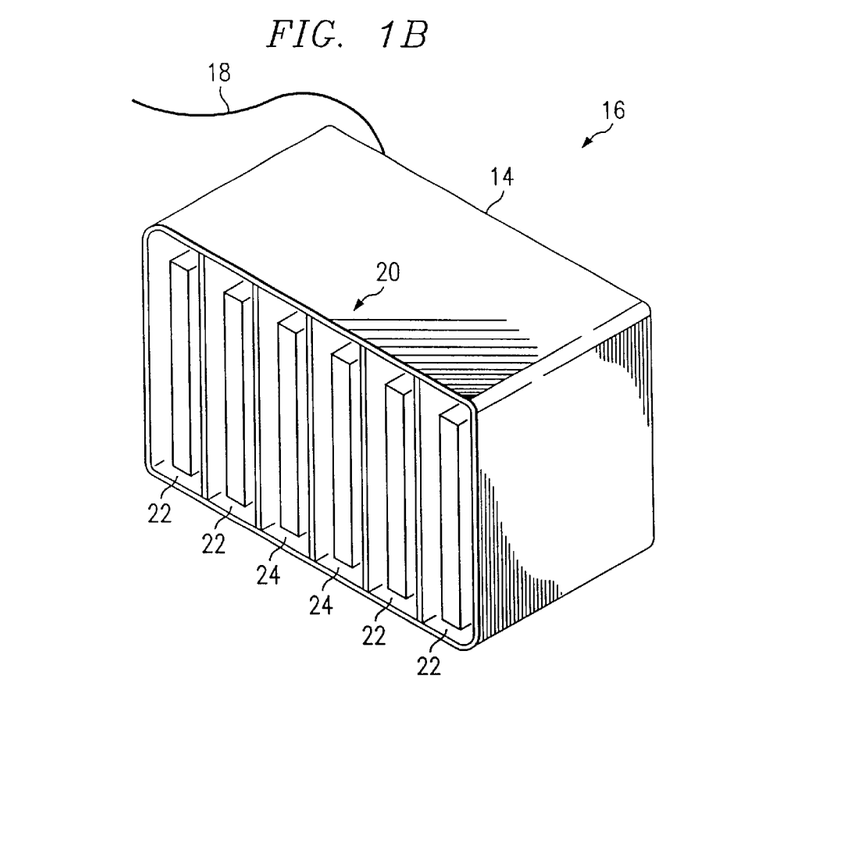
FIG. 1B is a block diagram of portions of the central office of FIG. 1A showing a telecommunications chassis according to the teachings of the invention.

FIG. 1B is a block diagram showing portions of central office 16. Shown in central office 16 is a telecommunications chassis 20 that includes a plurality of cards associated with processing communicated data. These cards may include, for example, line cards 22, network interface cards 24, and other types of cards. Line cards 22 function to receive data over telephone lines 14 and communicate the data to network interface card 24. Line cards 22 conversely communicate data received from network interface card 24 to an associated home 12a, 12b over telephone lines 14. Network interface card 24 may perform a plurality of functions associated with transmitting and receiving data between homes 12a, 12b and Internet backbone 18; however, one particular application is switching. According to one embodiment of the invention, network interface card 24 stores ATM cells temporarily and then transfers them at an appropriate time to a desired destination, as described in greater detail below in conjunction with FIG. 1C. Transferring the cells to a desired location is referred to as switching and, in this manner, network interface card 24 acts as an ATM switch.

Figure 1C:
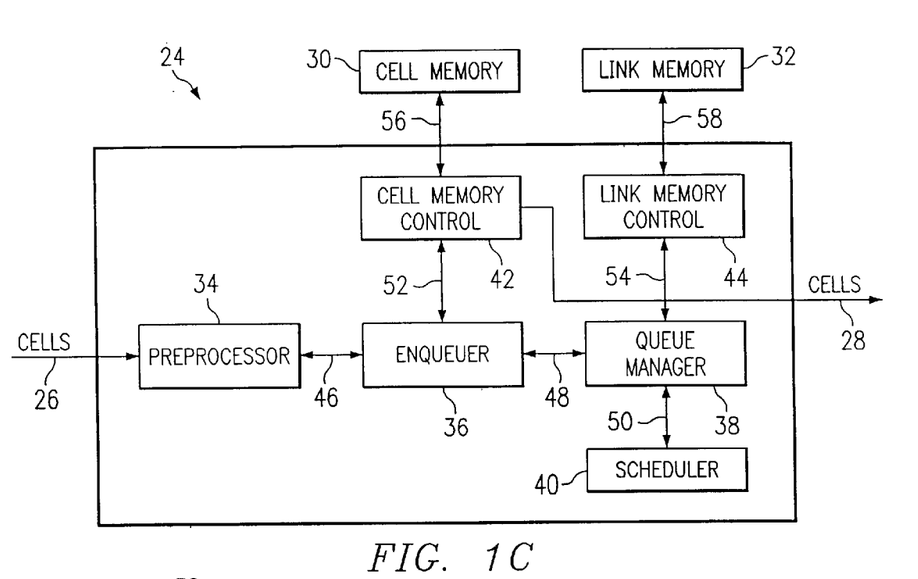
FIG. 1C is a block diagram of an ATM switch of FIG. 1B according to teachings of the invention.

FIG. 1C is a block diagram of the network interface card 24 of FIG. 1B. FIG. 1C also shows a cell memory 30 and a link memory 32 associated with network interface card 24.

Network interface card 24 receives a plurality of cells, denoted by reference numeral 26, stores the cells temporarily, and transmits the cells to a desired destination, denoted by reference numeral 28. Received cells may originate from homes 12a and 12b over telephone lines 14 and may be intended for destinations connected through Internet backbone 18. Alternatively, cells 26 may originate from sources connected to Internet backbone 18 and be intended for homes 12a and 12b. Received cells entering network interface card 24 are stored temporarily in cell memory 30. At an appropriate time the cells that are stored in cell memory 30 are transmitted to an appropriate destination, as denoted by reference numeral 28. Link memory 32 associated with network interface card 24 stores a plurality of queues designating the order in which the cells will be transferred to any one location, such as home 12a. For example, link memory 32 may store a queue associated with each potential destination, such as homes 12a and 12b. A plurality of cells may be received by network interface card 24 and stored in cell memory 30. These cells are then transferred at an appropriate time for receipt by home 12a. To facilitate such transfer, link memory 32 is used to designate the location of cells stored in cell memory 30 and the order that such cells are placed in and retrieved from a queue.

ATM switch 24 includes a plurality of elements to facilitate storing and retrieving data for transmittal. Such components include a preprocessor 34, an enqueuer 36, a queue manager 38, a scheduler 40, a cell memory control unit 42, and a link memory control unit 44. Preprocessor 34 communicates with enqueuer 36 through bi-directional link 46. Enqueuer 36 communicates with queue manager 38 through bi-directional link 48. Queue manager 50 communicates with scheduler 40 through bi-directional link 50. Enqueuer 36 communicates with cell memory control unit 42 through bi-directional link 52. Queue manager 38 communicates with link memory control unit 44 through bi-directional link 54. Cell memory control unit 42 communicates with cell memory 30 through bi-directional link 56. Link memory control unit 44 communicates with link memory 32 through bi-directional link 58. Cells of data retrieved from cell memory 30 are communicated through cell memory control unit 42 for transmission out of switch 24, as denoted by reference numeral 28.

Preprocessor 34 may perform a plurality of functions in receiving cells and conditioning them for receipt and processing by enqueuer 36. For example, preprocessor 34 may classify the received cell. Classification refers to identifying the origin of the cell and the type of the cell. Preprocessor 34 may also police the receipt of the cells. Policing refers to determining if a particular type of cell is allowed according to an associated service contract. The result of the classification and policing functions is provided to enqueuer 36 over lines 46, in addition to the received cells.

Enqueuer 36 either discards the cells if they are not allowed, or sends them to cell memory over link 52 in conjunction with cell memory control unit 42. As described in greater detail below, enqueuer 36 cooperates with queue manager 38 over bi-directional line 48 to generate a sequence of addresses to be stored in a queue designating the order of the received cells for later retrieval. According to one embodiment, a separate queue is maintained for each destination. Queue manager 38 communicates the sequence of addresses for storing in link memory 32 over link memory control unit 44. Scheduler 40 communicates with queue manager 38 at an appropriate time to initiate retrieval of data as needed, as described in greater detail below.

Figure 2A:
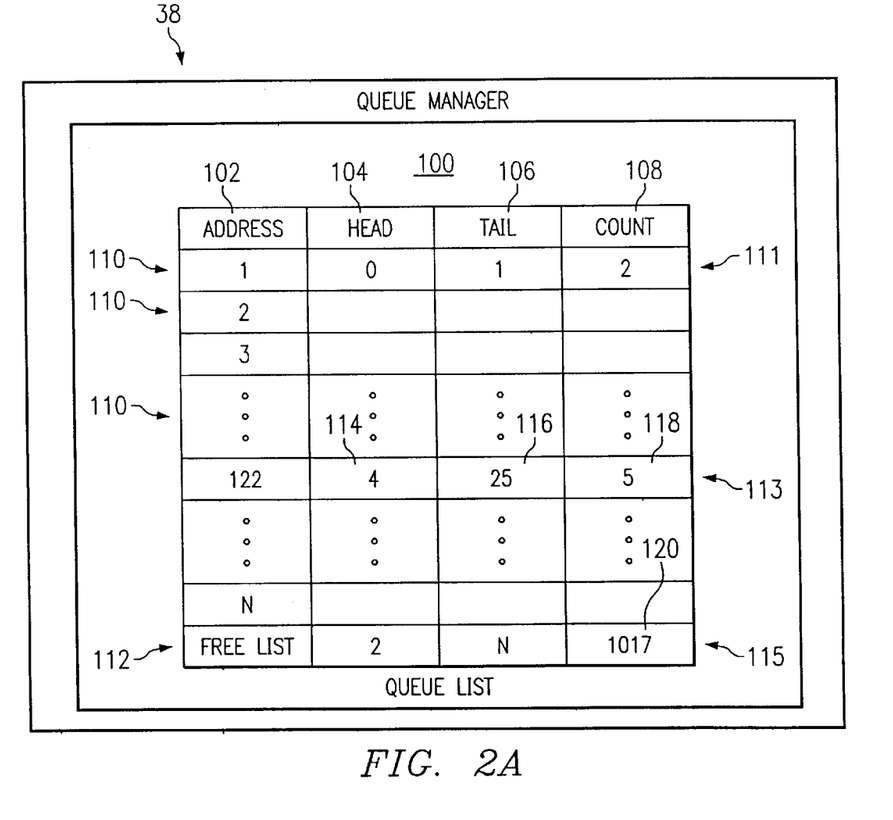
FIG. 2A is a block diagram of the queue manager of FIG. 1C showing additional details of the queue manager.

FIG. 2A is a block diagram of queue manager 38 showing additional details of the queue manager. In addition to circuitry and functionality for performing the functions previously described, queue manager 38 includes a queue list 100, illustrated in FIG. 2A. Queue list 100 is a list of all queues associated with network interface card 24. Queue list 100 comprises a plurality of portions. These include an address 102, a head 104, a tail 106, and a count 108. The combinations of these four parameters makes up a queue designator 110.

Address 102 is an address associated with a particular destination for data cells to be transferred. The various addresses are listed in FIG. 2A as address numbers 1 through N. In addition, a queue designator is maintained by queue list 100 for a free list, as designated by reference numeral 112. Free list 112 is not associated with any particular destination, but rather is a queue, maintained in link memory 32 of locations of all available cell addresses in cell memory 30.

Head entry 104 designates the first address in linked list memory 32 associated with the queue designator. Tail entry 106 represents the last entry in linked list memory 32 associated with the queue designator. Count entry 108 specifies the number of data cells indexed by the associated queue. In the example shown in FIG. 2A, the destination referenced by numeral "122" has a linked list stored in link memory 32 specifying the location of the underlying data cells. The head pointer, designated by reference numeral 114, having a value of "4", indicates that the location of the first data cell destined for destination numeral "122" may be determined by accessing link memory location "4." The tail pointer 116 for this destination has a value of "25." Tail pointer 116 indicates the last data value for this destination stored in a location in cell memory 30 can be determined by accessing link memory location 25. The count for this location, designated by reference numeral 118, having a value of "5", designates that there are five data cells to be received by destination 122.

With regard to free list 112, the free count, designated by reference numeral 115, provides the number of free cells available. In this example the number of free cells is 1017.

Figure 2B:
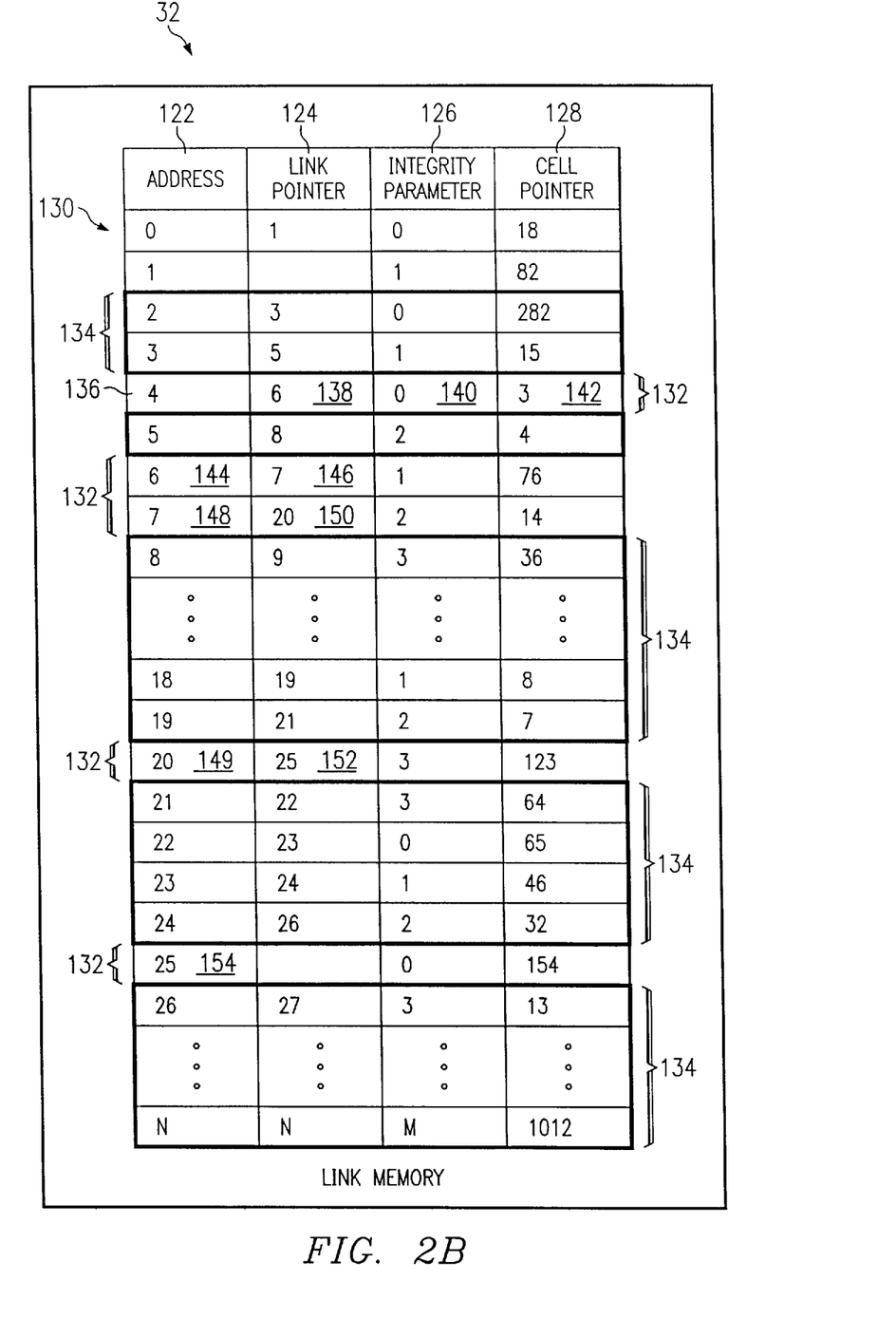
FIG. 2B is a block diagram of the link memory of FIG. 1C showing additional details of the link memory.

FIG. 2B is a block diagram of link memory 32 showing additional details of the memory. Link memory 32 has the following components: an address 122, a link pointer 124, and an integrity parameter 126. Shown in FIG. 2B is also a column having a "cell pointer" heading 128. As described in greater detail below, cell pointer heading 128 may be used in some implementation; however it is not used in other implementations.

Address column 122 designates an address within link memory. Link pointer 124 designates the next address in link memory associated with a given queue. Integrity parameter 126, associated with the link pointer at the same address in the queue, is used to verify the integrity of the link list for any given queue, as described in greater detail below. Cell pointer 128 stores the address location in cell memory 30 storing the actual data cell indexed by address 122 in link memory 32. In alternative embodiments, an explicit cell pointer 128 is not stored in link memory 32; rather, a one-to-one correspondence between address 122 and link memory 32 and an address in cell memory 30 is maintained. Thus, for example, a link list memory location having an address of "0" not only stores a link pointer to a next location 122 in link memory 32 (in this example, "1"), but also designates that the associated data cell is stored in cell memory 30 at a location having an address of "0."

In this example illustrated in FIG. 2B, two queues are shown in addition to the free list. A first queue 130 begins at address 0. A second queue 132 begins at address 4 and comprises nonconsecutive portions of link memory 32. The free list, designated by reference numeral 134, begins at address 2 and comprises nonconsecutive portions of link memory 32.

First queue 130 corresponds to the queue designator having a reference numeral of 111 in FIG. 2A. Second queue 132 corresponds to the queue designator having a reference numeral of 113 in FIG. 2A. Free list 134 corresponds to the queue designator having a reference numeral of 115 in FIG. 2A.

The entry values associated with the queue designated by reference numeral 132 will be described below as an example, with reference to FIGS. 2A and 2B. At queue designator location 113, in FIG. 2A, the head pointer 114 has a value of "4". This points to address "4" in link memory 32, designated by reference numeral 136 (FIG. 2B). Stored at address location 136 is a link pointer having a value of "6", designated by reference numeral 138. An integrity parameter having a value of "0", designated by reference numeral 140, is also stored. Integrity parameter 126 will be described in greater detail below. In addition, in some embodiments, an address into cell memory 30 is stored, as designated by reference numeral 142. In this example, the value "3" is stored; however, for purposes of this description, the cell address stored is not relevant and therefore will not be discussed for subsequent entries in link memory 32.

Link pointer 138, having a value of "6", points to the next location in memory associated with queue 132. This is address "6" designated by reference numeral 144. The associated link pointer, having a value of "7" and designated by reference numeral 146, points to address location number "7", designated by reference numeral 148. The associated link pointer, having a value of "20" and designated by reference numeral 150, points to address number "20". The link pointer at address number "20, having a value of "25", as designated by reference numeral 152, points to address location "25", designated by reference numeral 154. Address location "25" does not store a link pointer; rather, "25" is the tail pointer 116 for queue 132 (FIG. 2A). As indicated by count 118 in FIG. 2A, queue 134 should have five entries, which it does.

Each address location 136, 144, 148, 149, and 154 stores an integrity parameter 126. According to the teachings of the invention, integrity parameter 126 is stored in association with its respective link pointer 124. The value of integrity parameter 126 is examined upon reading link pointer 124. This value is then checked to determine that it is the expected value of integrity parameter 126. If it is not the expected value of integrity parameter 126, this indicates data corruption may have occurred with respect to link pointer 124. In such a case, action can be taken to avoid reusing the memory location associated with the respective link pointer. In the embodiment illustrated in FIG. 2B, integrity parameters 126 take on values determined by a sequence of numbers. In the illustrated sequence, when a new link pointer is written into link memory, an integrity parameter counter associated with each queue is incremented and written as the updated integrity parameter. Thus, with reference to queue number 134, the difference between integrity parameters associated with any successive link pointer is "1", up to a point. For example, at address location "4", having a link pointer having a value of "6", the integrity parameter is zero. The next subsequent location in the queue, designated by address number "6", stores a link pointer of 7. The associated integrity parameter is "1". Thus, the difference between the integrity parameter stored at address 6 and the integrity parameter stored at the previous location in the queue is "1".

In this example, the integrity counter is reset after it reaches a value of "3" so that a repeating sequence of the above numbers may be used. In some embodiments, the integrity parameter counter is not reset such that each link pointer will have a unique associated integrity parameter. This avoids two problems. First, as is described in greater detail below, at an appropriate time, the value of integrity parameter 126 is checked to verify the integrity of the memory storing its associated link pointer. However, if the integrity parameters repeat, there is a chance that the verification check will indicate the link memory is not corrupted when it is in fact corrupted. The second problem involves the method for verifying the value of the integrity parameter. One method for determining whether the value of the integrity parameter is correct is to subtract the current integrity parameter from the previous integrity parameter and examine the result. In this example, the result should be "1" in most instances. However, after the integrity parameter counter is reset, the difference will be "−3." Thus, in this example, the verification of the integrity parameter involves two checks: first, a determination of whether the difference between subsequent integrity parameters is 1, and if not, whether the difference is equal to "−3." If a two-bit counter is used, "−3" and "1" may both be represented by the binary number "01." In such a case, the verification of the integrity parameter involves a check for this binary number.

The embodiment illustrated in FIG. 2B shows only one example of possible sequences for integrity parameters 126. Additional examples are shown with reference to FIG. 3.

Figure 3:
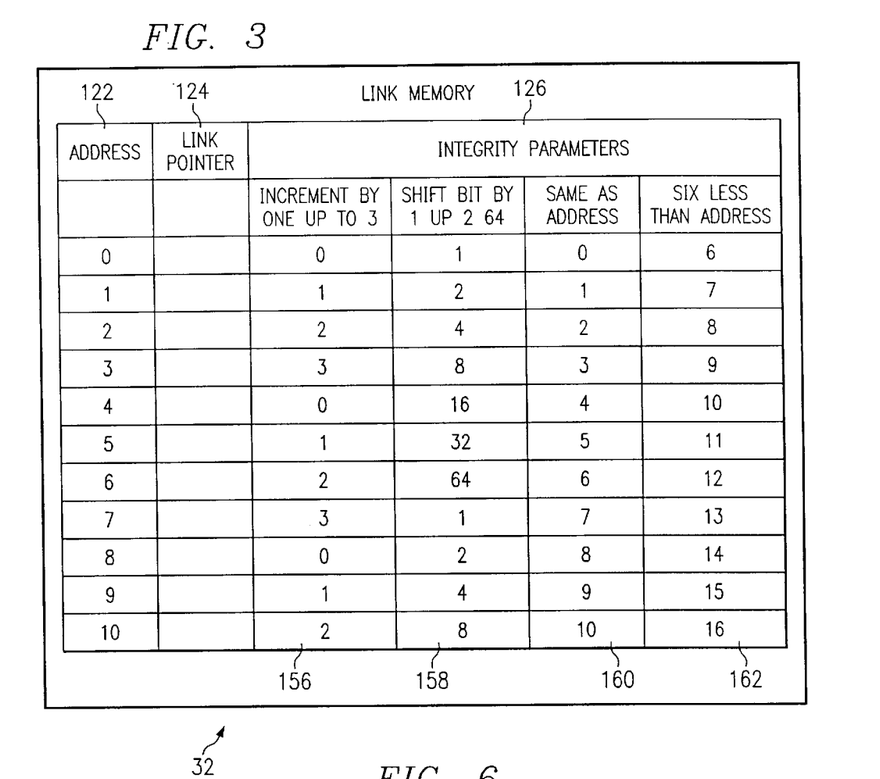
FIG. 3 is a block diagram of portions of the link memory of FIG. 1C showing a plurality of alternative sequences for integrity parameters according to teachings of the invention.

FIG. 3 is a block diagram of portions of link memory 32 showing additional examples of sequences for integrity parameters 126. Four sequences are shown in FIG. 3A corresponding to reference numerals 156, 158, 160, and 162. The sequence indicated by reference numeral 156 begins at "0" and increments to "3" and resets. This is the sequence described above in connection with FIG. 2B. A more general way of viewing this sequence is that it is a sequence that has a constant increase or decrease in value (in this example, a positive "1") for at least a portion of the sequence.

The sequence designated by reference 158 is a sequence in which the ratio between successive integrity parameters is the same for a portion of the sequence (in this example, "2"). The sequence designated by 160 is simply the value of the address at which the link pointer is stored. The sequence designated by reference numeral 162 is a function of the address 122 at which the link pointer is stored, in this example six more than the address 122. Other sequences that allow determination of whether the stored integrity parameter is read correctly may be used.

Figure 4:
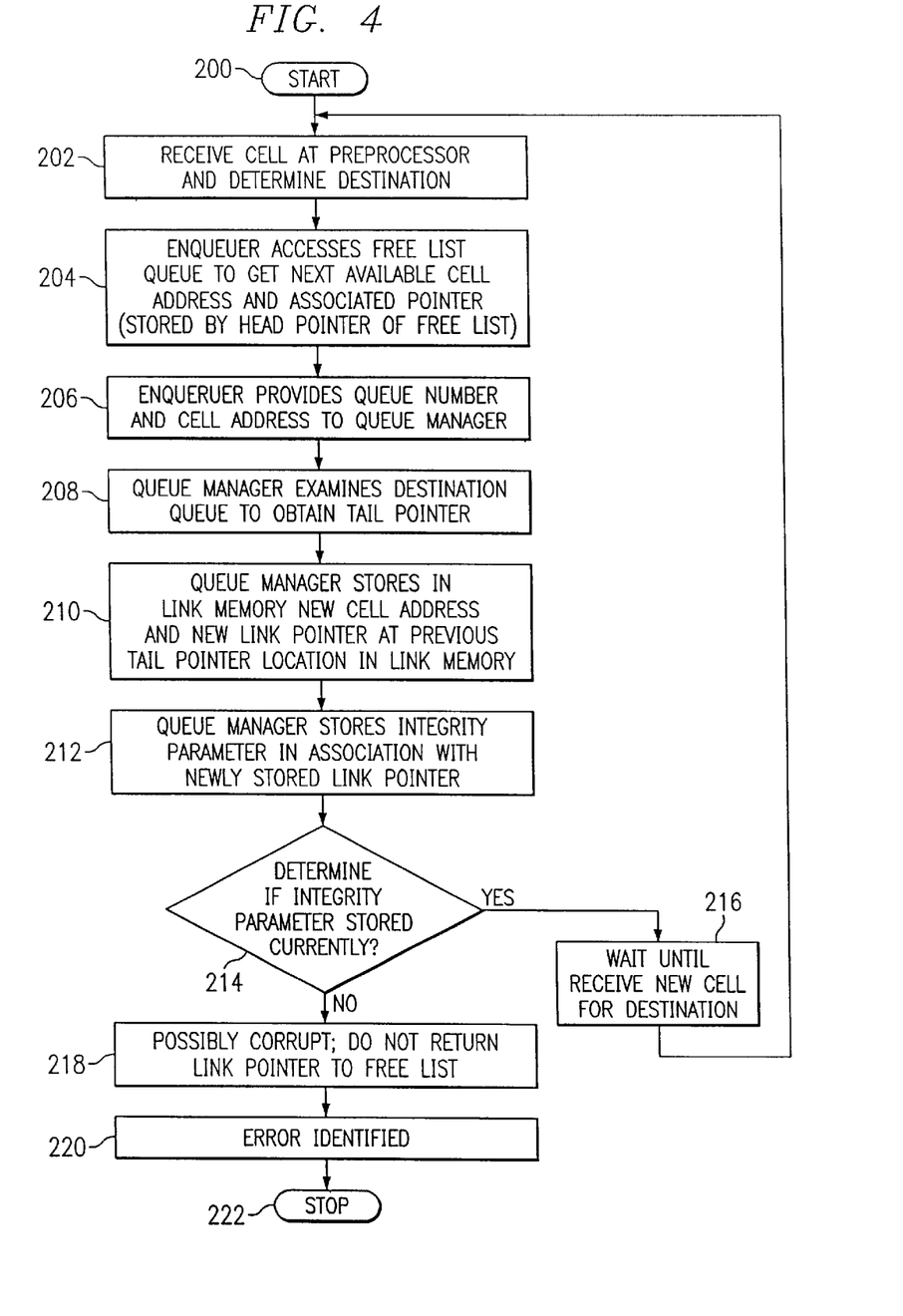
FIG. 4 is a flow chart illustrating a method for storing data according to the teachings of the invention.

FIG. 4 is a flow chart illustrating a method for storing data according to the teachings of the invention. The method begins at step 200. At a step 202 a cell is received. In one embodiment, the received cell may correspond to receipt of an ATM data cell at preprocessor 34 of ATM switch 24. Preprocessor 34 may determine the destination of the cell by examining the cell's header and the way in which the cell was received by switch 24. At a step 204, enqueuer 36 accesses the free list stored in queue manager 38 to determine the next available cell address. When enqueuer 36 accesses free list 134 to obtain the next available cell address, it also obtains the pointer to the next available cell address. This address is indexed by the head pointer of free list 134, and the actual cell address may be obtained from the free list queue 112 stored in link memory 32. At this point, the next available cell address that was read can be confirmed by verifying an integrity parameter associated with the cell address. Such verification may be performed as described below in conjunction with step 214. At a step 206, enqueuer 36 provides to queue manager 38 the queue number corresponding to the destination determined by preprocessor 34 and the cell address determined at step 204.

At step 208, queue manager 38 examines the destination queue corresponding to the queue number provided at step 206 to obtain the current tail pointer for the destination queue. The current tail pointer designates the link memory location at which the next link pointer should be stored. At step 210, queue manager 38 stores in link memory 32 the new cell address determined at step 204 and the new link pointer also determined at step 204. The new link pointer determined from step 204 is stored at the previous tail pointer location in link memory that was determined at step 208.

At step 212, which may be performed in conjunction with step 210, queue manager 38 stores an integrity parameter in association with the newly stored link pointer. This integrity parameter will be subsequently read to verify the integrity of the associated link pointer. The value for the stored integrity parameters may be determined in a number of ways. For example, a counter may be maintained for each queue that is incremented each time a new link pointer in the queue is added. Thus, the difference between subsequent integrity parameters in a given queue would be a constant number (except where the counter was reset). Alternatively, a counter may be used that is multiplied by a constant value, corresponding for example to a shift in bits. Thus the ratio of integrity parameters corresponding to successive pointers would be a constant value (except where the counter was reset). In other embodiments, the integrity parameter may be associated with the address in link memory storing the associated pointer. Thus, for example, the integrity parameter may be simply the address value storing the associated link pointer. In other embodiments, the integrity parameter may be a prescribed function of the address in link memory storing the associated pointer. Methods for determining whether any of these types of integrity parameters are stored correctly are described in greater detail below in conjunction with FIGS. 5 and 6.

At a step 214 a determination is made of whether the integrity parameter was stored correctly. This decisional step may be performed immediately after storing the associated link pointer and integrity parameter, or in other embodiments may be delayed until the time in which the associated data is actually needed. Details associated with this determination are described in greater detail in conjunction with FIGS. 5 and 6.

If the decisional step 214 is performed at this point, and it is determined that the link pointer was written correctly, step 216 processing waits until additional data is received, at which point processing continues again at step 202. If a determination is made at step 214 that the integrity parameter was not stored correctly, this indicates that the memory location in link memory storing the associated link pointer is possibly corrupt. In response, the associated data pointers for the queue are not provided back to free list 112 at step 218. This prevents the possibly corrupt data location from ever being used.

At step 220 an error indication may be provided, indicating that a particular data location is possibly corrupt. This error indication may take any suitable form, including setting an error flag. Additionally, the count of a counter may be adjusted (not explicitly shown) so that the number of memory locations that are possibly corrupt is known. It may be desirable to reset the card or discard a particular memory after a certain percentage of memory locations have been determined to be possibly corrupted. Processing concludes at step 222.

Figure 5:
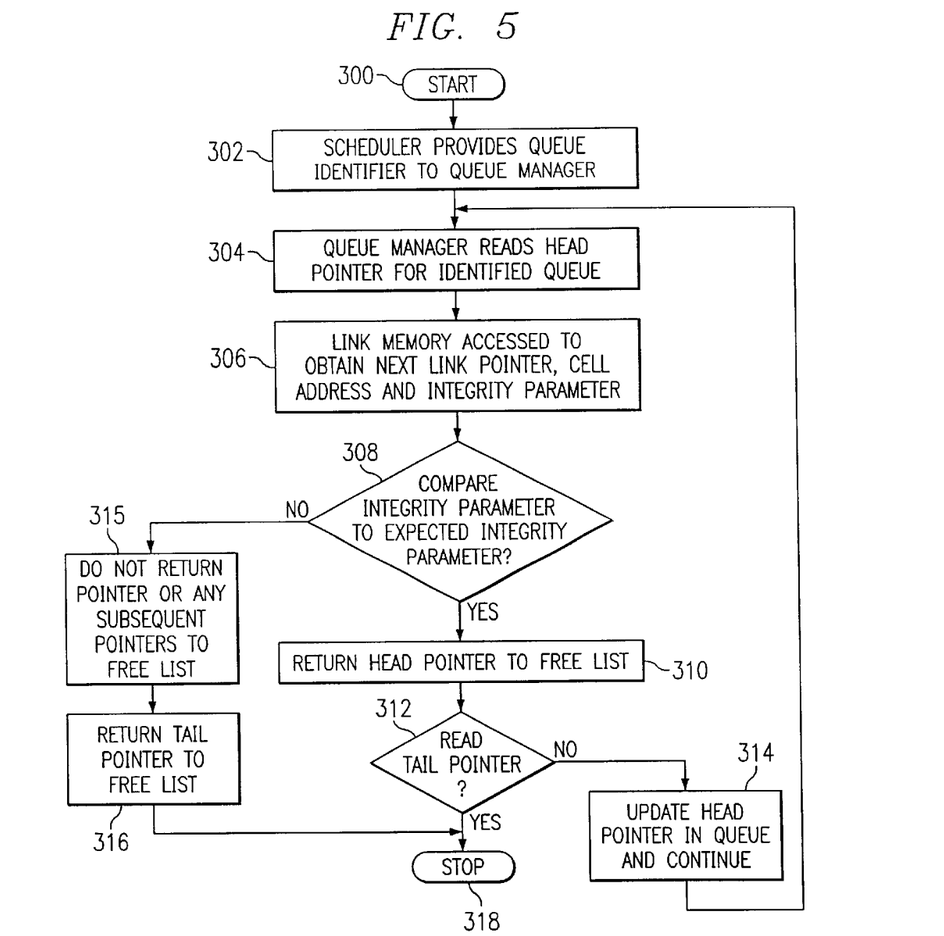
FIG. 5 is a flow chart showing one method for reading and verifying data according to the teachings of the invention.

FIG. 5 is a flow chart illustrating a method for reading and verifying data according to the teachings of the invention. The method begins at step 300. A step 302 scheduler 40 provides a queue identifier to queue manager 38. The queue identifier designates a particular destination is ready to receive data. At step 304, queue manager 38 reads the head pointer for the identified queue. At step 306 link memory 32 is accessed to obtain the cell address associated with the head pointer, the next link pointer, and the stored integrity parameter. At decisional step 308, the read integrity parameter is compared to the expected value for the integrity parameter. This comparison may be made in a variety of manners depending on the approach utilized for designating integrity parameters. Additional details of the step are described with reference to FIG. 6.

If the result of step 308 indicates the read integrity parameter matches its expected value, this suggests that there is no corruption in the memory location in linked memory 32 storing the associated link pointer. Processing continues at step 310 where the previous head pointer is returned to the free list. Because the check at step 308 indicated the memory address designated by the last head pointer was not corrupted, this pointer may be returned to the free list for subsequent use. At a step 312, a determination is made of whether the tail pointer has been reached, indicating there is no more data available for the destination receiving data. If the tail pointer has not been reached, processing continues at step 314. At step 314, the tail pointer for the current queue is updated and processing repeats at step 304.

At step 315, if the decision at step 308 indicates the current address location was possibly corrupted, further use of addresses in the linked list for the present queue is halted by not returning the current pointer and all subsequent pointers for the queue to the free list. The count of a counter may be adjusted at this point so that the number of memory locations that are possibly corrupt is known. At step 316 the tail pointer is returned to the free list because the tail pointer is conventionally stored in a separate register that would not be affected by corruption in a previous pointer in the linked list. If the tail pointer is reached at step 312 the method concludes at step 318.

Figure 6:
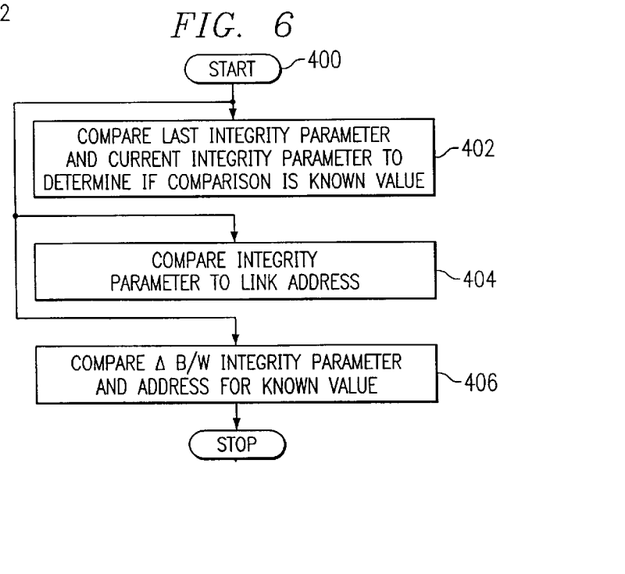
FIG. 6 is a flow chart illustrating example steps for effecting a comparison step in the flow chart illustrated in FIG. 5.

FIG. 6 is a flow chart illustrating example methods for effecting step 308 of comparing the integrity parameter to an expected integrity parameter. The method begins at step 400.

At a step 402, the last integrity parameter and the current integrity parameter are compared to determine if the comparison results in a known value. An example of such a comparison is subtracting the current integrity parameter from the last integrity parameter to determine if the value is "1". This corresponds to the example illustrated in FIGS. 2B and 3 associated with sequence 156. In another example, the comparison is made by dividing the current integrity parameter by the last integrity parameter. This corresponds to the example shown in FIG. 3 associated with sequence 158, in which a constant ratio existed between successive integrity parameters. Step 402 may also include a subsequent check to determine if a particular condition exists arising from resetting of an integrity parameter counter. For example, in the example described in conjunction with sequence 156, an additional check would be made to determine if the difference between the current integrity parameter and the last integrity parameter was "−3". This indicates that the read value for the current integrity parameter is correct.

Alternatively, at a step 404, the read integrity parameter may be compared to the link address. A simple way for determining whether the integrity parameter has been read correctly is whether it has the same value as the link address. This corresponds to the example shown in FIG. 3 associated with sequence 160. Other suitable functions of the link address may also be used.

At a step 406, another alternative method for determining whether the read integrity parameter was stored correctly is illustrated in this example, the difference between the integrity parameter and the link address is compared to a known value. This corresponds to the example shown in FIG. 3 associated with sequence 162 in which the integrity parameter was a known function of the link memory address.

Thus, a method and system have been provided for verifying link list memory integrity by utilizing an integrity parameter that is stored in conjunction with a link pointer in the link list memory.

Although the present invention has been described with several example embodiments, various changes and modifications may be suggested to one skilled in art. It is intended that the present invention encompass those changes and modifications as they fall within the scope of the claims.

What is claimed is:

1. A method for testing linked list integrity comprising:
   storing a plurality of link pointers in memory in association with respective integrity parameters, the link pointers pointing to a next location in the memory storing a subsequent link pointer in the linked list;
   reading the stored integrity parameter for at least one of the link pointers; and
   determining whether the value of the read integrity parameter matches the value of the stored integrity parameter.

2. The method of claim 1, wherein the integrity parameters are stored in association with the respective linked portions such that, for at least some of the link pointers, the difference between successive integrity parameters is a predetermined value.

3. The method of claim 1, wherein the integrity parameters are stored in association with the respective link pointers such that, for at least some of the sequential link pointers, a ratio between successive integrity parameters is a predetermined value.

4. The method of claim 1, wherein the integrity parameters are stored in association with the respective link pointers such that the value of the integrity parameters is the same as the address in link memory storing the associated link pointer.

5. The method of claim 1, wherein the integrity parameters are stored in association with the respective link pointers such that, for at least some of the link pointers, the value of the stored link pointer is a function of the address in link memory in which the associated link pointer is stored.

6. The method of claim 1, and further comprising, in response to determining that the value of the read integrity parameter does not match the value of the stored integrity parameter, preventing usage of the link pointer associated with a stored integrity parameter.

7. The method of claim 1, wherein determining whether the value of the read integrity value matches the value of the stored integrity parameter comprises comparing two successive integrity parameters to determine if the difference between the two is a predetermined value.

8. The method of claim 1, wherein determining whether the value of the read integrity value matches the value of the stored integrity parameter comprises comparing two successive integrity parameters to determine whether a ratio between the two is a predetermined value.

9. The method of claim 1, wherein determining whether the value of the read integrity value matches the value of the stored integrity parameter comprises comparing the read integrity parameter to the associated address in link memory.

10. The method of claim 1, wherein determining whether the value of the read integrity parameter matches the value of the stored integrity parameter comprises determining, by an enqueuer in an ATM switch whether the value of the read integrity parameter matches the value of the stored integrity parameter.

11. The method of claim 1 and further comprising, in response to determining that the value of the plurality of read integrity parameters does not match the value of the associated plurality of stored integrity parameters, preventing usage of the associated pointers.

12. The method of claim 11 and further comprising storing a count of the number of pointers for which usage is prevented.

13. An apparatus comprising:
   a linked list memory operable to store a linked list, the linked list comprising a plurality of link pointers for associated queues and also comprising respective integrity parameters;
   a queue list operable to store a plurality of queues entries associated with data destined for respective destinations, each queue entry comprising a head pointer and a tail pointer for an associated queue in the linked list; and
   an enqueuer operable to determine whether the value of an integrity parameter read from the linked list memory matches the associated integrity parameter written to the linked list memory.

14. The apparatus of claim 13, wherein the integrity parameters are stored in association with the respective linked portions such that, for at least some of the link pointers, the difference between successive integrity parameters is a predetermined value.

15. The apparatus of claim 13, wherein the integrity parameters are stored in association with the respective link pointers such that, for at least some of the sequential link pointers, a ratio between two successive integrity parameters is a predetermined value.

16. The apparatus of claim 13, wherein the integrity parameters are stored in association with the respective link pointers such that the value of the integrity parameters is the same as the address in link memory storing the associated link pointer.

17. The apparatus of claim 13, wherein the integrity parameters are stored in association with the respective link pointers such that, for at least some of the link pointers, the value of the stored link pointer is a function of the address in link memory in which the associated link pointer is stored.

18. The apparatus of claim 13, and further comprising, in response to determining that the value of the read integrity parameter does not match the value of the stored integrity parameter, preventing usage of the link pointer associated with a stored integrity parameter.

19. The apparatus of claim 13, wherein the enqueuer is further operable to determine whether the value of the read integrity value matches the value of the stored integrity parameter by comparing two successive integrity parameters to determine if the difference between the two is a predetermined value.

20. The apparatus of claim 13, wherein the enqueuer is further operable to determine whether the value of the read integrity value matches the value of the stored integrity parameter by comparing two successive integrity parameters to determine whether a ratio between the two is a predetermined value.

21. The apparatus of claim 13, wherein the enqueuer is further operable to determine whether the value of the read integrity value matches the value of the stored integrity parameter by comparing the read integrity parameter to the associated address in link memory.

22. The apparatus of claim 13, wherein the enqueuer is further operable to determine whether the value of the read integrity parameter matches the value of the stored integrity parameter by determining, by an enqueuer in an ATM switch whether the value of the read integrity parameter matches the value of the stored integrity parameter.

23. The apparatus of claim 13 wherein the enqueuer is further operable in response to determining that the value of the plurality of read integrity parameters does not match the value of the associated plurality of stored integrity parameters, to prevent usage of the associated pointers.

24. The apparatus of claim 23 wherein the enqueuer is further operable to store a count of the number of pointers for which usage is prevented.

25. The apparatus of claim 13 wherein the queue list is further operable to store a free list.

26. A method for testing linked list integrity in an ATM switch, the method comprising:
   storing a plurality of sequential link pointers in memory in association with respective integrity parameters, the link pointers pointing to a next location in memory storing a subsequent link pointer in the linked list, the integrity parameters stored in association with the respective link pointers such that, for at least some of the sequential link pointers, the difference between the integrity parameters associated with the stored sequential link pointers is a predetermined value;
   accessing the linked list and reading one of the stored link pointers from the plurality of sequential link pointers and the associated integrity parameter;
   accessing the linked list and reading the next stored link pointer subsequent to the read link pointer and also reading the associated integrity parameter; and
   determining whether the difference between the two read integrity parameters is the predetermined value.

27. The method of claim 26, wherein the integrity parameters are stored in association with the respective linked portions such that, for at least some of the link pointers, the difference between successive integrity parameters is a predetermined value.

28. The method of claim 26, wherein the integrity parameters are stored in association with the respective link pointers such that, for at least some of the sequential link pointers, a ratio between successive integrity parameters is a predetermined value.

29. The method of claim 26, wherein the integrity parameters are stored in association with the respective link pointers such that the value of the integrity parameters is the same as the address in link memory storing the associated link pointer.

30. The method of claim 26, wherein the integrity parameters are stored in association with the respective link pointers such that, for at least some of the link pointers, the value of the stored link pointer is a function of the address in link memory in which the associated link pointer is stored.

31. The method of claim 26, and further comprising, in response to determining that the value of the read integrity parameter does not match the value of the stored integrity parameter, preventing usage of the link pointer associated with a stored integrity parameter.

32. The method of claim 26, wherein determining whether the value of the read integrity value matches the value of the stored integrity parameter comprises comparing subsequent integrity parameters to determine if the difference between the two is a predetermined value.

33. The method of claim 26, wherein determining whether the value of the read integrity value matches the value of the stored integrity parameter comprises comparing subsequent integrity parameters to determine whether their ratio is a predetermined value.

34. The method of claim 26, wherein determining whether the value of the read integrity value matches the value of the stored integrity parameter comprises comparing the read integrity parameter to the associated address in link memory.

35. The method of claim 26, wherein determining whether the value of the read integrity parameter matches the value of the stored integrity parameter comprises determining, by an enqueuer in an ATM switch whether the value of the read integrity parameter matches the value of the stored integrity parameter.

36. The method of claim 26 and further comprising, in response to determining that the value of the plurality of read integrity parameters does not match the value of the associated plurality of stored integrity parameters, preventing usage of the associated pointers.

37. The method of claim 36 and further comprising storing a count of the number of pointers for which usage is prevented.

38. A system for storing data comprising:
   means for storing a plurality of link pointers in memory in association with respective integrity parameters, the link pointers pointing to a next location in the memory storing a subsequent link pointer in the linked list;
   means for reading the stored integrity parameter for at least one of the link pointers; and
   means for determining whether the value of the read integrity parameter matches the value of the stored integrity parameter.

* * * * *